Jan. 25, 1955　　F. E. HAMILTON ET AL　　2,700,502
MULTIDIGIT SHIFTING DEVICE
Original Filed Jan. 19, 1949　　7 Sheets-Sheet 1
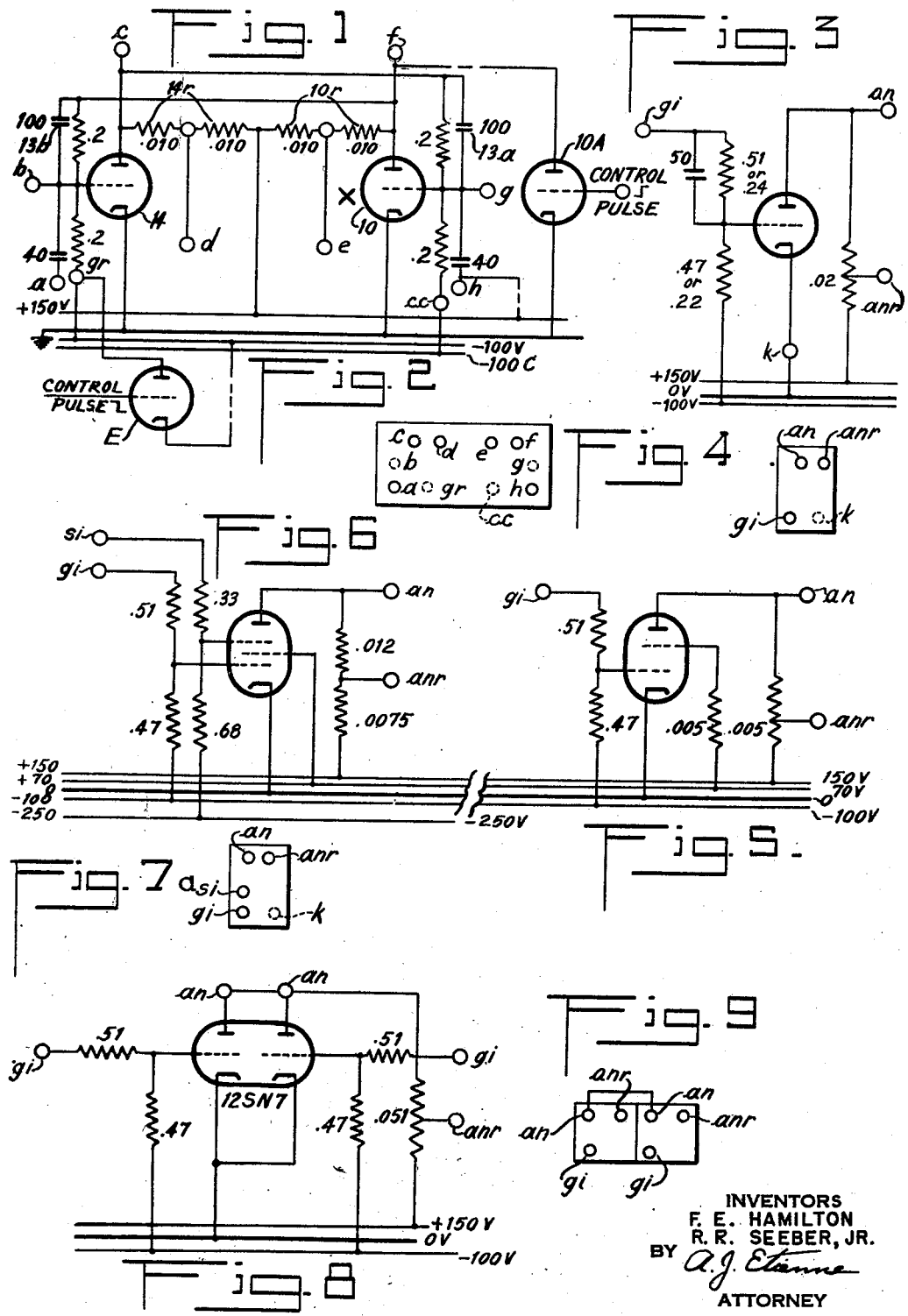
INVENTORS
F. E. HAMILTON
R. R. SEEBER, JR.
BY A. J. Etienne
ATTORNEY

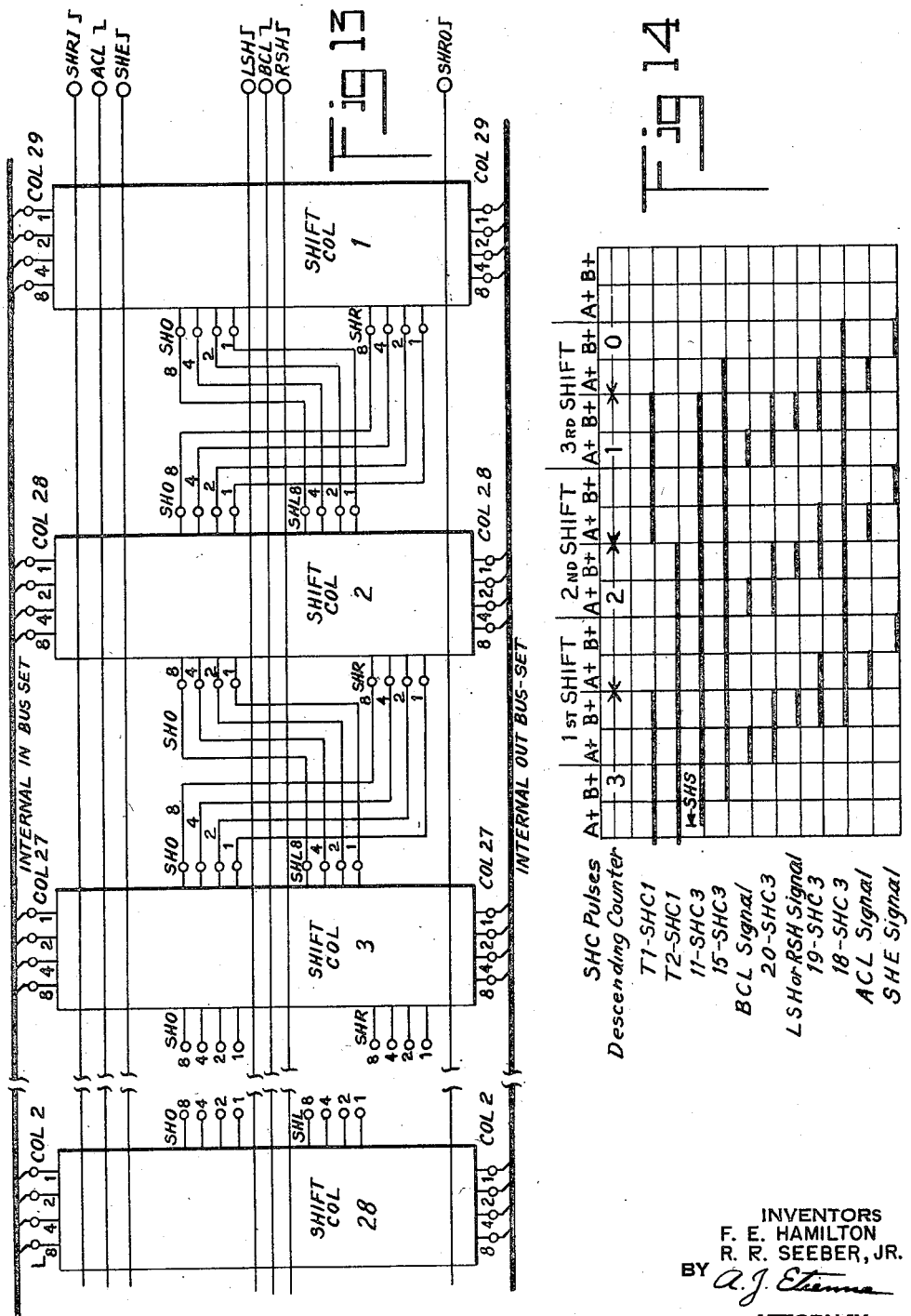

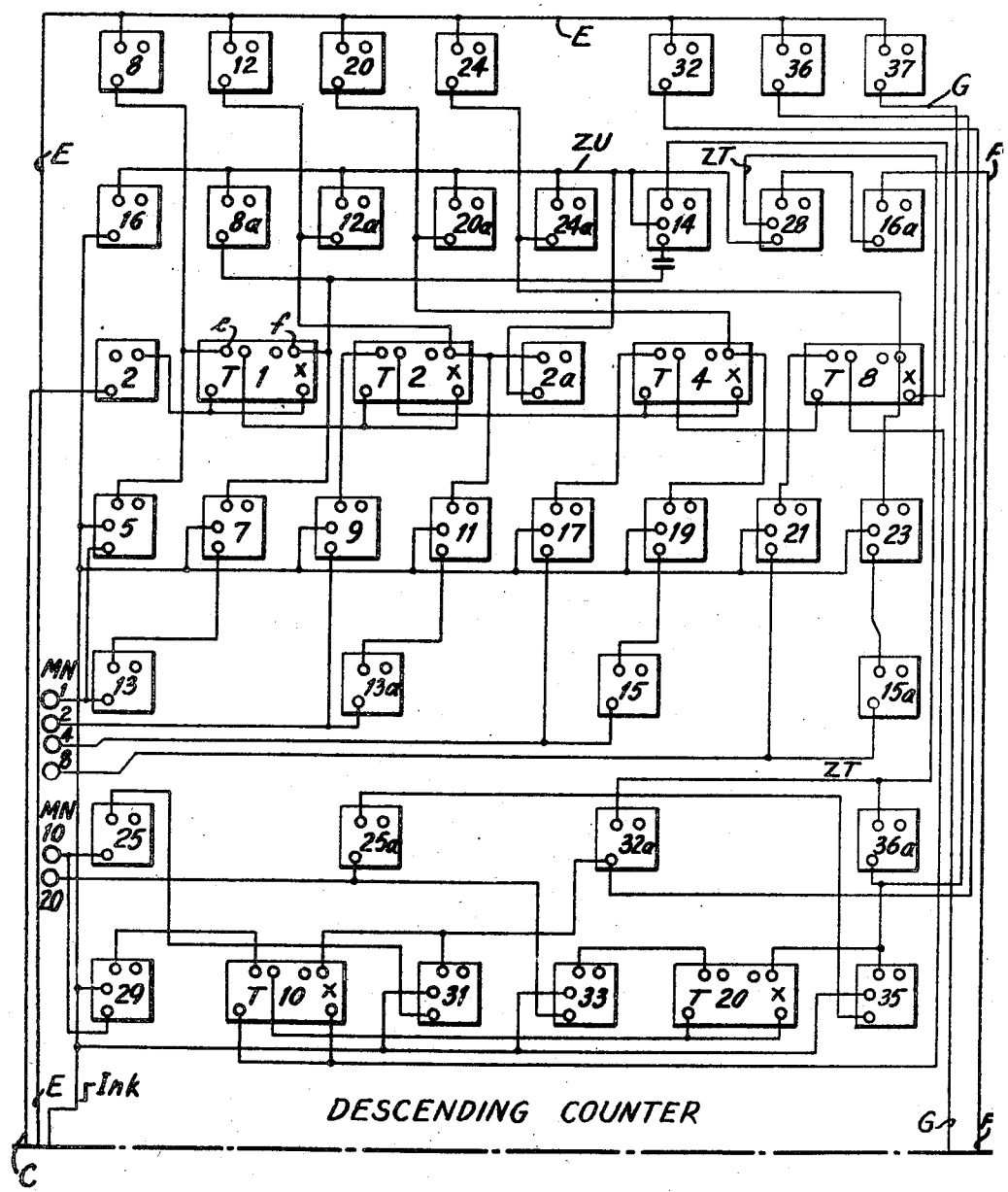

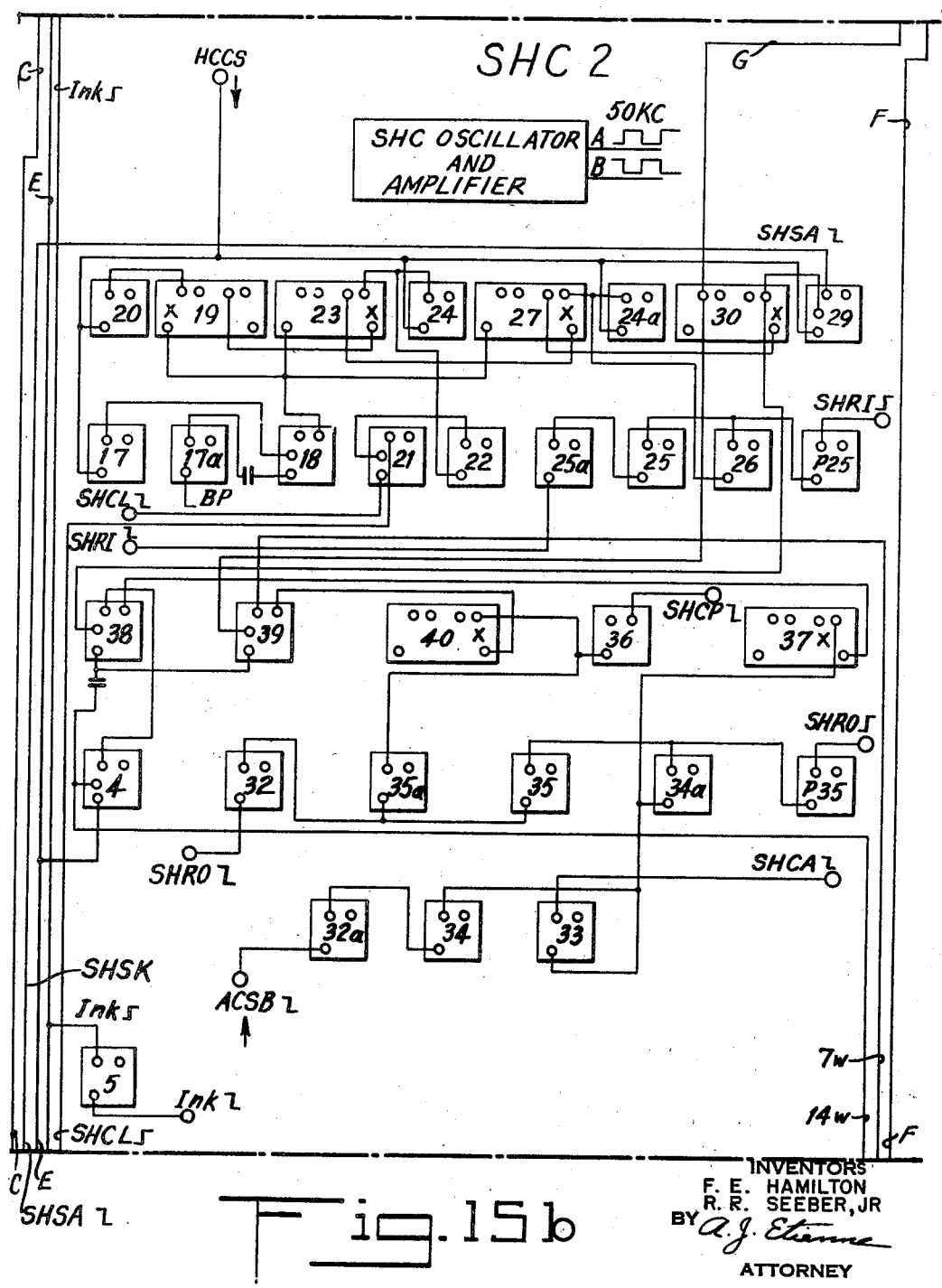

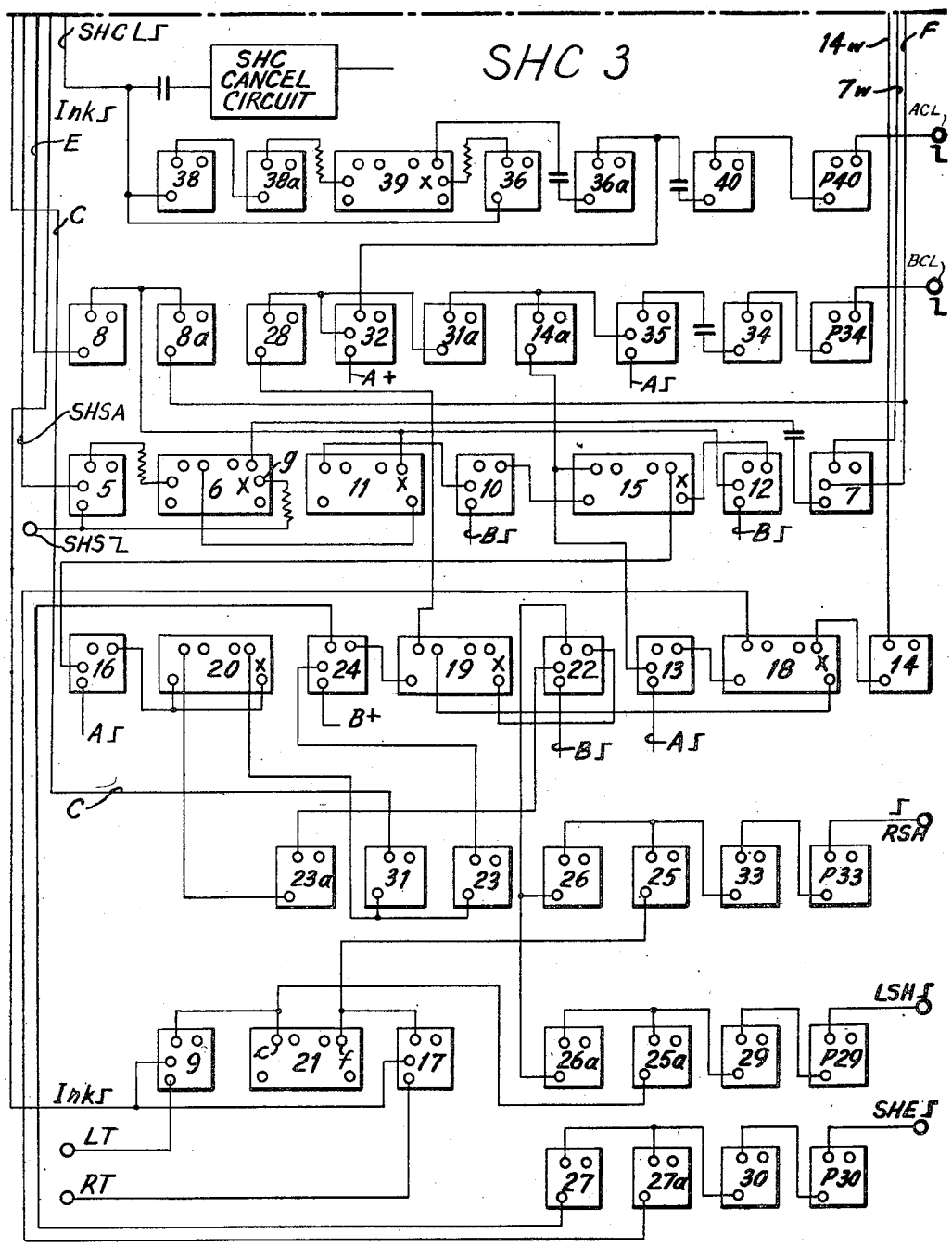

United States Patent Office 2,700,502
Patented Jan. 25, 1955

2,700,502
MULTIDIGIT SHIFTING DEVICE

Francis E. Hamilton, Binghamton, and Robert R. Seeber, Jr., New York, N. Y., assignors to International Business Machines Corporation, New York, N. Y., a corporation of New York Original application January 19, 1949, Serial No. 71,642, now Patent No. 2,636,672, dated April 28, 1953. Divided and this application March 27, 1952, Serial No. 278,876

27 Claims. (Cl. 235—61)

The present invention relates to electronic computers and more specifically to denominational shift means commonly referred to as column shift means for electronic computers and is a division of the copending application of Hamilton et al., Serial No. 71,642, filed January 19, 1949, now Patent 2,636,672 issued April 28, 1953.

One of the objects of the present invention is to provide electronic shift means for producing shift in either of two directions.

Another object is to provide electronic shift means in combination with means for measuring and regulating the number of steps of shift.

A further object is to provide in combination with electronic shift means, means for determining selectively the number of steps of shift, including zero steps of shift.

Another object is to provide, in combination, electronic shift means and means for determining both the direction and amounts of shift.

A further object is to provide electronic shift means for producing shift of an entry in one order of a register to another order, each order comprising means for representing any digit of any radix.

Still another object is to provide electronic shift means for producing shift of an entry in one order of a register to another order, each order comprising a plurality of means for representing any digit in any radix.

Another object is to provide selective shift means for producing a shift of an entry in any order of a register to another order, each order comprising means for representing any digit by a permutation of elements less in number than the radix employed.

A further object is to provide electronic column shift means for shifting all digit values in a plural order register in one operation.

Still another object is to provide means for producing column shift from one order of a register to another order and also producing a still further indication of the respective values of the respective orders.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a detailed wiring diagram of a typical trigger circuit employed in the denominational shift means.

Fig. 2 is a block symbol of the device of Fig. 1.

Fig. 3 is a detailed wiring diagram of a triode of the invention.

Fig. 4 is a block symbol of the device of Fig. 3 and also is representative of a tetrode.

Fig. 5 is a detailed wiring diagram of a tetrode employed in the invention.

Fig. 6 is a detailed wiring diagram of a pentode employed in the invention.

Fig. 7 is a block diagram of the device of Fig. 6.

Fig. 8 is a detailed wiring diagram of a lock couple employed in the invention.

Fig. 9 is a block diagram of the device of Fig. 8.

Fig. 13 is a block diagram of the complete denominational shift device.

Fig. 14 is a timing chart of operations occurring during a single step of denominational shift and;

Figure 10:
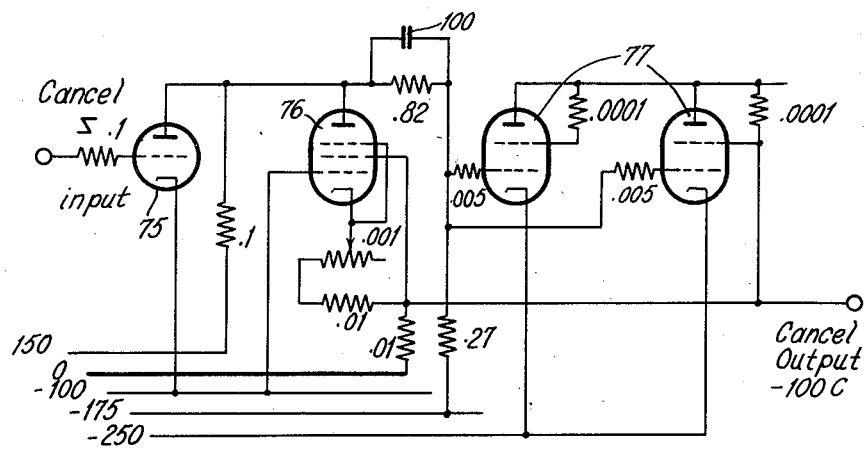
Fig. 10 is a detailed wiring diagram of a cancel circuit employed in the invention.

Figs. 15a, 15b and 15c taken together, one placed above the other, comprise a block wiring diagram of the internal commutator and descending counter for controlling the denominational shift means of the invention.

Before proceeding to the detailed description of the device, a brief explanation of the manner in which the description will be developed will first be given.

Figs. 1 to 11, inclusive, illustrate the details and block representations of all the elements of circuitry employed in the novel denominational shift means. Fig. 12 is a complete diagram of one order of the novel shift means and including the input to and the output from the shift means, in which the respective elements of circuitry are indicated by the blocks, covered in detail in Figs. 1 to 11. Fig. 13 indicates the manner in which several columns of the shift means, as illustrated in Fig. 12, are connected together to comprise the complete shift device. Fig. 14 is a timing diagram which, taken together with drawings 15a, 15b and 15c, illustrate, in block diagram and by timing, the internal commutator and descending counter operation as employed in controlling shift either to the right or to the left and for a preselected number of steps.

Before proceeding to the description of the novel shift means, as illustrated in Figs. 12, 13, 14 and Figs. 15a, 15b and 15c, the circuit elements of Figs. 1 to 11, inclusive, will be described in detail. Subsequent to such description, of the circuitry of the various elements comprising the blocks in the diagrams of the shift device, it will be assumed that the operation of the circuits within the blocks, as illustrated in Figs. 12, 13, 14 and Figs. 15a, 15b and 15c, will be understood. The particular circuitry will now be described.

General circuit data

A source of supply (not shown) is provided for the voltage lines running through the various circuits. This source supplies the voltages shown in the various figures. The line —100C is a cancel bias line, the purpose of which will be explained in the subsequent descriptions of the trigger and cancel circuit. The triodes used in the circuits are of the 6SN7 type and may be the halves of twin tubes 12SN7. The tetrodes, which are used mainly as power amplifiers, are of the 25L6 type. The pentodes are generally of the 6SK7 type. In some instances 6SJ7 tubes are used.

Resistance values shown are in megohms and capacitance values in micromicrofarads, unless otherwise indicated.

Referring to Fig. 3 which is the detailed circuit of a triode as employed in the novel shift device, the cathode terminal $k$ of the triode is shown as connected to ground or 0 v. line. The anode terminal $an$ is connected through a resistor to the +150 v. line. The value of the resistor for an individually operated triode is generally .02 meg. Operation of the triode is generally effected by applying a pulse from the output of another tube to its input terminal $gi$. This input terminal leads to a voltage divider which is tapped by a connection to the grid of the triode. The voltage divider terminates at the —100 v. line. That portion of the voltage divider, between the grid and the —100 v. line, generally has a resistance value of .47 meg. and the other portion of the voltage divider, in that event, has a resistance value of .51 meg. In some instances, where it is desired to reduce the time constant or to provide for a smaller grid leak impedance, the resistance values of the upper and lower portions (as shown) of the voltage divider are .24 and .22. The input potential to the voltage divider generally has a swing from about 50 v. to 150 v. although in extreme instances the input voltage may descend to about 15 v. It may be seen from Fig. 3 that the triode is normally biased to cut-off when the input potential to the voltage divider is at its lower value. When the input voltage rises to its upper value, then the grid potential is driven above cut-off and the tube conducts. Where it is required to increase the rapidity of response to an input pulse, the upper portion of the voltage divider is shunted by a capacitor, which is generally 50 mmf. The anode resistor may be tapped at a suitable point $anr$ for connection to an element to be operated by the output of the triode. It is to be understood that constants given are merely illustrative and that other appropriate constants may be used.

Fig. 5 is the detailed wiring diagram of a tetrode and indicates appropriate values for the circuit elements thereof. The screen grid of the tetrode is generally connected by a .005 meg. resistor to the +70 v. line. Operation of the tetrode is effected in the same general manner as the triode.

Fig. 4 is a block diagram representing either the triode or the tetrode. The cathode terminal $k$ in the block diagram will be omitted except where it is necessary to an understanding of the operation of the tube. It is to be understood that tetrodes will be used wherever power amplification is a prime requisite.

Fig. 6 is the detailed wiring diagram of a pentode. The screen grid is generally connected directly to the +70 v. line. Suitable values for the anode resistor and the portions of the voltage dividers connected to the control grid and the suppressor are indicated. The operation of the control grid is effected similarly to the operation of the control grid of the triode and the input terminal for that voltage divider which is tapped by the control grid is marked $gi$. Another input terminal $si$ is connected through a resistor generally having a value of .33 meg. to the suppressor grid and the suppressor grid is connected through a resistor of .68 meg. to the —250 v. line. The input potential to the terminal $si$ also varies from about 50 v. to 150 v., in general, although as previously indicated in discussing the input potential to the terminal $gi$, the input potential may drop to as low as 15 v. It is seen from Fig. 6 that when the input potential on either terminal $si$ or $gi$ is at its low value, the pentode is cut off. Both the input potentials to terminals $si$ and $gi$ must be at their upper levels in order to render the pentode conductive. Fig. 7 is the block diagram representing the pentode of Fig. 6.

The output potentials at the terminals $an$ of the triode and the pentode may be taken as having a lower value of approximately 40 to 50 v. when the tube is conductive. However, it is quite possible for the potential at the anode of a pentode to drop to as low as 15 v. The anode resistor will be tapped at a point such as to provide the necessary working potential for an element to be controlled by the tube. It may be stated that where the output of the tube is to be applied to both input terminals $a$ and $h$ of a trigger (see Fig. 1), then the tap point $anr$ is generally the midpoint of the anode resistor. Where the output potential of a tube is to be applied to only one of the terminals $a$ and $h$ of a trigger, as described below, the point $anr$ is generally connected through a .0075 meg. resistor to the +150 v. line and connected through a .012 resistor to the anode of the tube.

Fig. 8 shows the 12SN7 tube with both triode sections of the tube having their anodes connected to each other. The common anode resistor in such case generally has the value .051 meg. The inputs to the sections are separate so that each of the sections may be individually operated. This circuit may be referred to as a lock couple. Both of the tube sections must be cut off in order to allow the common anode line to attain its upper voltage level. If both tube sections are at cut-off and one of the sections is then made conductive, the common anode potential generally will drop to about 50 v. Fig. 9 is the block symbol for the lock couple of Fig. 8.

The block symbols will be employed in the circuit diagrams of the machine. It may be mentioned that the impulses to the input terminals of the tubes may be applied through coupling capacitors which are of varying capacities depending on the desired pulse shape to be transmitted by the capacitor to the input terminal.

Where it is necessary to clarification, arrows will be used to indicate whether signals are coming in or going out of a circuit.

Where a coupling capacitor is used to transmit a pulse to a grid of a tube, the coupling capacitor is not shunted by a resistor. For instance, if a pulse is to be applied to the grid of the triode shown in Fig. 3 through a coupling capacitor, the resistor, shown in this figure as shunting the capacitor, is omitted. In some instances a tube may be used as a cathode follower in which case suitable resistance will be provided between the cathode of the tube and a voltage supply line. A tube may be biased normally to cut-off or to conductive condition. Where it is necessary to clarification, the normally conductive tube will be identified by the small letter $x$ placed adjacent the symbol for the tube, for example, as shown adjacent the right hand triode 10 of Fig. 1.

Elements in a block diagram circuit may be identified by a particular reference character, taken together with a general reference legend for the circuit, which legend may be the figure number or a capital letter or letters. Where an element is thus identified in an item of the description, subsequent mention of elements of the same circuit will be made without reference to the general identifying legend unless mention of another circuit figure intervenes or unless it is necessary to clarification.

*The trigger*

One of the fundamental elements of the circuits is a double-stability electronic trigger circuit which will be called simply a trigger. The general form of this trigger is shown in Fig. 1. Typical constants are indicated for the trigger but it is understood that other suitable constants may be used. This trigger is fully discussed in Application Serial No. 569,992 of Palmer and Phelps, filed December 27, 1944, now Patent 2,536,955. Briefly, it includes two retroactively coupled tubes 10 and 14. In one stable state of the trigger, tube 10 is conductive and its anode terminal $f$ is at about 50 v., while tube 14 is non-conductive and its anode terminal $c$ at about 150 v. In the opposite stable state of the trigger, tube 10 is non-conductive and point $f$ is about 150 v. while tube 14 is conductive and point $c$ at about 50 v. Upon reversal of the trigger from one stable state to the other, there is a steep drop in potential or negative going impulse of about 100 v. at the anode terminal of the previously non-conductive tube and a simultaneous rise in potential or positive going impulse of about +100 v. at the anode terminal of the other tube. Also, a negative impulse of about 50 v. appears at the midpoint $d$ of the anode resistor 14$r$ when the trigger is reversed from the status in which tube 14 is non-conductive to the status in which this tube is conductive. Also, upon return to its previous status in which tube 10 again is conductive, a negative impulse of about 50 v. appears at the midpoint $e$ of the anode resistor 10$r$. It is characteristic of this trigger that it reacts sensitively to a negative impulse of suitable amplitude but is insensitive to a similarly applied positive impulse of like amplitude. In the present case, a negative impulse of about 40 v. applied to the trigger input terminal $a$ or $h$ is effective to reverse the trigger, but a similarly applied positive pulse of the same amplitude is not effective to reverse the trigger. A negative impulse of about 50 v. applied concurrently to both $a$ and $h$ will be effective to reverse the trigger but a positive impulse of the same amplitude and similarly applied will be ineffective. Reversal of the trigger, however, may be effected by directly impressing adequate positive potential (about 150 v.) on the grid terminal of the non-conducting tube of the trigger. Where an impulse source is connected to only one of points $a$ or $h$, the other point terminates at the +150 v. line, thus adding stability to the trigger.

Reversal of the trigger also may be effected by an auxiliary circuit operable to draw current though anode resistor 10$r$ or 14$r$ so as to depress the potential at the terminal $c$ or $f$ to about 50 v. Such auxiliary circuit may take the form of an auxiliary tube. For instance, in Fig. 3, a triode 10A is indicated as having its anode connectible to terminal $f$ of tube 10. If tube 10A is rendered conductive, then it will force the potential at terminal $f$ down to about 50 v., reversing the trigger to that status in which tube 10 is conducting or blocking reversal of the trigger from this status.

In some instances the trigger may omit the coupling capacitors 13$a$ and 13$b$, these capacitors being essential as a rule only if it is desired to trip the trigger by applying impulses simultaneously to the points $a$ and $h$.

It will be noted that in Fig. 1, the grid resistor of tube 10 terminates at the cancel line —100C which is normally at —100 v. potential, but in other instances where needed, the cancel line will be connected to the grid resistor of tube 14. A positive cancel impulse will be applied at a desired time to the line —100C to increase its potential to approximately ground potential. This will reset the trigger to that state in which the tube, connected to the cancel line through the grid resistor, is conductive. The reset status of a trigger is denoted by the small letter $x$ adjacent the tube which is conducting in the reset status, as for example the $x$ adjacent tube 10 in Fig. 1.

In some instances, the grid resistor terminal $gr$ is connected to the —100 v. line through an auxiliary tube E. When this auxiliary tube is conductive it simply acts as a low impedance connection between the grid resistor and the —100 v. line and allows the trigger to function in a normal manner. When the auxiliary tube E is rendered non-conductive, its anode potential and therefore the potential at the grid of the connected tube 14 rises above cut-off potential and causes the trigger to assume the status in which tube 14 is conductive. The auxiliary tube E may thus be used to reverse a trigger. The block symbol for the trigger is shown in Fig. 2. The terminals, shown in dotted lines, will be omitted in most instances, in order to simplify the drawings and will be shown only where they are utilized in controlling the trigger. The cancelled status of the trigger will be considered as its normal reset status and the trigger will be spoken of as being turned and returned or reversed and reset, it being understood that the reset or return is to its shown cancelled status.

Basic cancel circuit

Fig. 10 shows the basic cancel circuit operable to cancel a group of triggers. A plurality of such circuits are provided for various groups of triggers in the machine. The basic cancel circuit includes a normally cut off tube 75, a voltage regulator tube 76, and one or a group of power tubes 77, depending on the power requirement. The output of 77 is connected to the cancel line —100C of a group of triggers. The constants of the cancel circuit are such that 77 is normally conductive to sustain line —100C at —100 v. The voltage of line —100C may fluctuate slightly according to changes in the states of the connected triggers. These fluctuations are counteracted through the action of the voltage regulator tube 76 and its circuit. For instance, if line —100C goes slightly more negative than —100 v., it causes the voltage regulator tube to become proportionately more conductive so as to increase the negative bias on 77. As the negative bias on 77 increases, its output voltage rises, increasing the voltage on line —100C to —100 v. When it is desired to cancel or reset the group of triggers, a positive cancel signal is applied to tube 75 to make it conduct and thus negatively bias 77 to non-conductive condition. The line —100C thereupon rises to substantially cathode potential, so that the connected triggers are reset to the states indicated by the $x$ marks.

Figure 11:
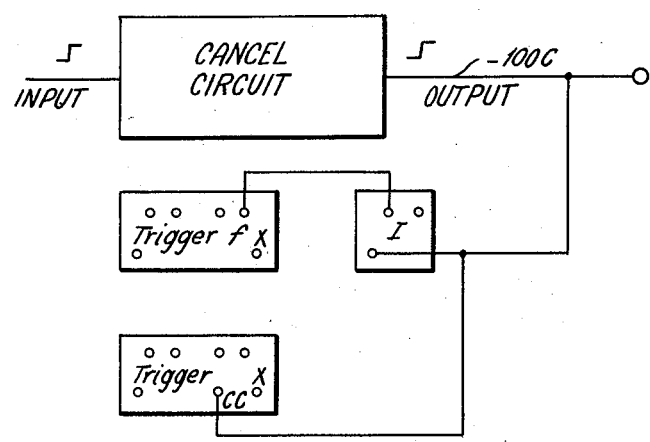
Fig. 11 is a block diagram of the device of Fig. 10 and further illustrates connections of the cancel circuit output to triggers to be cancelled.
Figure 12:
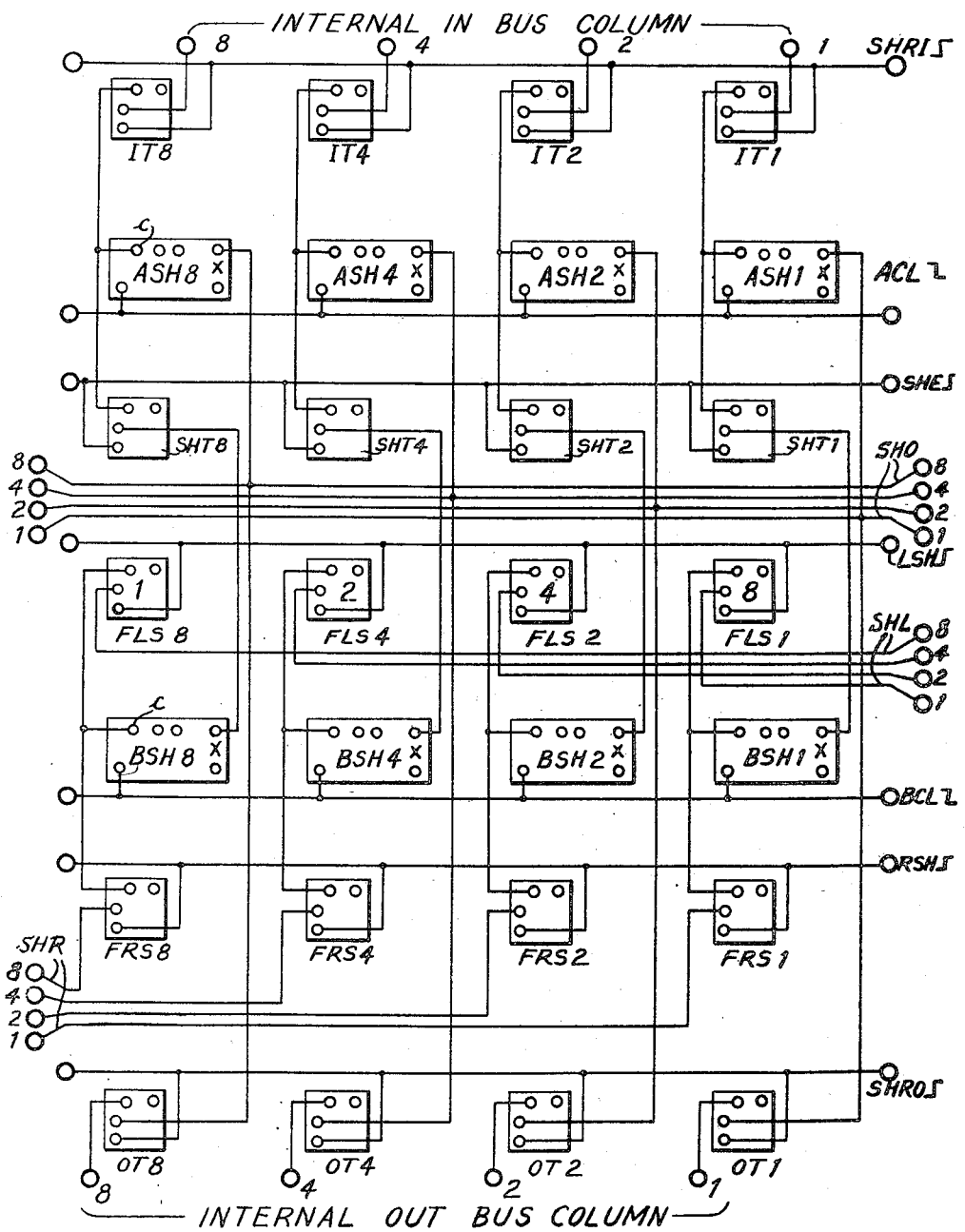
Fig. 12 is a block diagram of one column of the denominational shift unit.

Fig. 11 shows in block diagram the basic cancel circuit and also two methods employed by the cancel circuit to reset a trigger. According to one method, the cancel circuit output —100C is connected to the terminal $cc$ of a trigger (also see Fig. 1). According to the other method, the line —100C is connected to the grid of an inverter tube I which serves, in the manner of tube 10A in Fig. 1, to force a trigger to its reset status when the tube becomes conductive. Thus, when a positive cancel signal is applied to the input of the cancel circuit, its output line rises in potential and renders tube I conductive to reset the trigger.

Having described the details of circuitry of each of the circuit elements employed in the novel denominational shift device, the device itself will now be described with reference only to the respective block representations of the circuit elements.

The denominational shift device

Fig. 12 shows in block form one order of the novel column shift device. Its purpose is to shift an amount a selected predetermined number of columns and selectively either to the right or the left. The multi-digit amount to be shifted is sent into the denominational shift unit from the Internal In bus column and delivered to the Internal Out bus column. The shift unit has 28 shift columns (Fig. 13) each one like that disclosed in Fig. 12. Shift columns 1 to 28 are associated, respectively (Fig. 13), with Internal bus columns 29 to 2.

Each column (Fig. 12) of the denominational shift unit has a set of elements allotted to each of the four binary positions in the particular embodiment illustrated. The pentodes IT1, IT2, IT4, and IT8 are the input tubes of a shift column and their suppressors are coupled to buses 1, 2, 4, and 8, respectively, of a column of the Internal In bus column. The bits of the binary decimal terms of a digit are represented by increased potential selectively present in the respective buses of an Internal In bus column. Therefore, tubes IT are selectively conditioned according to these bits of the binary decimal terms. Subsequent to conditioning of the tubes IT, a positive entry timing signal SHRI as shown, is applied to the control grids of the pentodes, rendering only the selectively conditioned tubes conductive. The anodes of IT1, 2, 4, and 8 are coupled to terminals $c$ of triggers ASH1, ASH2, ASH4, and ASH8, respectively. When a tube IT becomes conductive, it reverses the corresponding trigger ASH. A first negative cancel signal ACL is applied to points $a$ of all the triggers ASH to reset only those which are not being held in turned state by conductive tubes IT. The signal ACL is produced concurrently with signal SHRI but is shorter and has a briefer effect, so that the triggers ASH, turned under control of signal SHRI, remain turned to store on an entry. The turned triggers ASH apply increased potential to correspondingly numbered output lines SHO. As an example, assume the binary decimal bits 1 and 4, representing digit 5, have been applied to a shift column, conditioning, respectively, tubes IT1 and 4. The entry signal SHRI will render the conditioned tubes IT1 and IT4 conductive causing them to reverse the respective triggers ASH1 and ASH4 only, which thereupon apply increased potential to the output lines SHO1 and SHO4. As indicated diagrammatically in Fig. 13, the output lines SHO1, SHO2, SHO4, and SHO8, of each shift column, except the end columns 1 and 28, connect to the shift columns at the right and also at the left. The connection to the column at the right is to a set of input lines SHR while the connection to the column at the left is to a set of input lines SHL. The lines SHL1, SHL2, SHL4, and SHL8 (Fig. 12) are coupled to the suppressors of tubes FLS1, FLS2, FLS4, and FLS8, respectively. The respective lines SHR are coupled to the suppressors of a similar set of tubes FRS. It is seen therefore that increased potentials on output lines SHO of a column are applied to the input lines SHL of the column at the left to condition its tubes FLS selectively and at the same time the increased potentials on the lines SHO are applied to the input lines SHR of the column at the right to condition its tubes FRS. The outputs of both tubes FLS1 and FRS1 of a shift column connect to point $c$ of a trigger BSH1. Similarly, FLS2 and FRS2 are connected to BSH2; FLS4 and FRS4 are connected to BSH4; and FLS8 and FRS8 are connected to BSH8.

After the application of the entry signal SHRI and cancel signal ACL to the denominational shift unit, as just described, we proceed to denominational shift, per se, by means of a negative cancel signal BCL which as shown (Fig. 12) is applied to reset all the triggers BSH, of which there are four for each column, to the condition as indicated. Next, after resetting triggers BSH, either selected one, or two positive signals RSH and LSH as shown, is applied to the denominational shift unit, depending on whether the shift is to be effected towards the right or the left. Assuming that the shift is to be effected towards the right, the signal RSH is applied and it will render only the conditioned ones of the tubes FRS conductive which in turn reverse the associated triggers BSH. If, instead, the shift is to be effected towards the left, then the signal LSH is applied and causes the conditioned ones only of the tubes FLS to conduct so as to similarly reverse the associated triggers BSH. As will now be understood, a digit entered in a shift column is ready to be shifted to the right or the left but is permitted to shift only in one direction, depending on whether the left or right shift signal is applied to the denominational shift unit. Also, each intermediate shift column has applied to it, in the form of conditioning potential, a digit from the column at its right and also another digit from the column at its left but it is to be noted that finally only one of these digits will be actually shifted into the column. If the shift is to be to the right, then the digit shifted into a column comes from the column at the left while if the shift is to be to the left, then the digit comes from the column at the right. The shifted digit, from the left or from the right, is manifested by the selective reversals of triggers BSH1, BSH2, BSH4, and BSH8 which temporarily store the shifted digit. After the digit has been shifted into these triggers BSH, the triggers ASH, of each column, are again reset by a signal ACL, in preparation for receiving this shifted digit from the temporary storage triggers BSH of the same column. Only reversed triggers BSH condition related pentodes SHT. The signal following this last mentioned reset of triggers ASH, is, as shown, a positive signal SHE which renders only the conditioned ones of the tubes SHT conductive, to in turn selectively reverse the related triggers ASH. In this manner, a digit which has been shifted into a column is entered in its triggers ASH.

Briefly, in summarizing the operation so far, after the application of the digits of a number from the Internal In bus column to tubes IT of the associated shift column, those triggers ASH which do not have bits of signal applied thereto are reset by a cancel signal ACL while a signal SHRI causes the conditioned tubes IT to conduct and set the related triggers ASH according to the digit in the column. Triggers ASH, in each shift column, thereupon apply the digit to both the flanking shift columns. The denominational shift unit is now ready to perform one or more successive column shift steps. The subsequent sequence of signals in each shift step is summarized as follows:

1. The cancel signal BCL is applied to cause triggers BSH to be reset, preparing them to receive a shifted digit.
2. The shift signal RSH or the alternative shift signal LSH is applied to cause, either the right or left shifted digits, to be entered in triggers BSH. For a shift to the right, the signal RSH is applied and the digits shift into the columns at the right while for a shift to the left the signal LSH is applied and the digits shift into the columns at the left.
3. The cancel signal ACL is applied to clear the triggers ASH of each column, of the digits previously entered therein and now shifted to an adjacent column.
4. The signal SHE is applied to transfer the digit, shifted into a column, from its triggers BSH to its triggers ASH.

Each above sequence effects a single step of column shift. This same sequence is repeated as many times as the number of steps of column shift to be effected. For instance, if eleven steps of column shift are to take place, then the sequence is repeated eleven times. It will be understood that if the original amount has, say, 28 digits, eleven steps of column shift, to the right, will drop out the eleven right-hand digits, leaving seventeen of the original digits in positions displaced eleven places to the right of their original places.

After completion of the desired number of steps of column shift, the amount remaining in the denominational shift unit and manifested by the selectively reversed triggers ASH is read out to the respective Internal Out bus columns. For this, only those triggers ASH which are in reversed status, condition related output tubes OT8, 4, 2 and 1. A positive read out signal SHRO is applied, after completion of the desired number of shift steps, to the tubes OT to render the conditioned ones only of the tubes OT conductive. In this manner, the amount now in the column shift unit is read out, in its binary decimal form, as decreased potentials selectively applied to the buses 8, 4, 2 and 1 in respective columns of the Internal Out bus columns.

The number of steps of column shift is determined by increased potentials selectively applied (Fig. 15a) to lines MN1, 2, 4, 8, 10 and 20 of the internal commutator of the denominational shift unit which in turn set the descending type electronic counter, units and tens orders, with the amount of shift as described below, said counter being described and claimed in Patent 2,500,294 issued March 4, 1950 to B. E. Phelps. Briefly, this counter has a complete units order of triggers T1, 2, 4 and 8 (Fig. 15a) and a partial tens order comprised of triggers T10 and T20. The column shift amount may be referred to as the minuend and the tens order entry can not exceed −2−. Since any number up to −9− can be entered in the units order, the maximum number of column shift steps is 29. As described in detail in said patent each trigger in the counter is supplied with three tubes which control the application of a binary decimal bit to the trigger. For instance, trigger T1 (Fig. 15a) has its terminal c coupled to the plate of a pentode 5–SHC1 and its terminal f coupled to the plate of a pentode 7. The control grid of 7 is connected to the plate of a triode 13 while the control grids of 5 and 13 are connected to the line MN1. Subsequent to the selective application of increased potentials on the input lines MN, a positive going timing signal Ink is applied to the suppressors of the pentodes 5, 7 and other similar tubes, relating to the other triggers of the descending counter. Assume, for instance, that line MN1 is at increased potential. Accordingly, the application of a timing signal renders 13 and 5 both conductive. Since 13 is conductive, it keeps 7 in a non-conductive condition. Since 5 becomes conductive and 7 remains non-conductive, the trigger T1 is reversed. In this manner a binary bit of value 1 is applied to the descending counter. Similarly, tubes 9, 11 and 13a may serve to apply a binary bit of value 2 to the trigger T2 while tubes 15, 17 and 19 may serve to apply a binary bit of value 4 to the trigger 14 and tubes 15a, 21 and 23 may similarly serve to apply the binary bit of value 8 to the trigger T8. Tubes 25, 29 and 31 pertain to the tens order and function to apply binary bit of value 1 in the trigger T10 thereof while the tubes 25a, 33 and 35 may serve to apply a binary bit of value 2 to the tens order trigger T20 which, as stated above is the highest binary bit value that may be entered in this order. The tubes 7, 11, 19, 23, 31 and 35 function as blocking tubes to prevent reversal of the associated triggers if a binary bit is not to be applied to these triggers. For instance, if the amount to be entered does not contain the binary bit 4 in the units order, the tubes 15 and 17 remain non-conductive. With 15 non-conductive, it conditions 19. Accordingly, the timing signal Ink will render 19 conductive to block reversal of trigger T4. Such blocking action is necessitated by the interconnections between the triggers. At this point it may also be stated that when the units order of the counter is at 0, the line ZU (Fig. 15a) is at increased potential and thus renders a tube 2a conductive to block the reversal of trigger T2. Such blocking action must be inhibited during the application of a minuend to the counter inasmuch as such minuend may include the binary bit 2 in the units order. For this reason, a triode 16 has its plate coupled to the line ZU and its control grid connected to the line upon which the signal Ink is applied. This signal will render 16 conductive so as to insure the presence, at the time, of a decreased potential upon the line ZU. The tube 2a will thus become non-conductive and will be ineffective to block reversal of trigger 2 during the application of the minuend to the descending counter.

For each step of column shift, the descending counter will be driven one step in a descending count sense. The stepping of the counter is effected by negative entry pulses coming from a tube 2 which is operated as described presently. Each entry pulse is applied to the both sides of the trigger T1 in the units order. Hence, the trigger will be shifted in response to each such entry pulse. As one specific example, assume that the minuend 17 has been applied to the descending counter, seven being applied to the units order and one to the tens order. Hence, triggers T1, 2, 4 in the units order and T10 in the tens order are in reversed states, prior to the application of count down entry pulses. The first count down entry pulse returns trigger T1, leaving 6 standing in the units order. The second entry pulse reverses trigger T1 which thereupon applies a negative pulse to both sides of trigger T2 causing it to return to the shown status. Since triggers T1 and T4 are now in reversed status, the units order stands at 5. The third pulse returns trigger T1, leaving 4 in the units order. The fourth pulse again reverses trigger T1 causing it to effect reversal of trigger T2. As T2 reverses, it applies a negative pulse to opposite sides of trigger T4, returning it to shown status. Since triggers T1 and T2 are now in reversed status the units order stands at 3. The fifth pulse returns trigger T1 leaving the units order at 2. The sixth pulse again reverses trigger T1 which causes trigger T2 to return. Since trigger T1 now is the only reversed trigger in the units order, the units order stands at 1. The seventh pulse restores trigger T1 and the units order then stands at 0. It is seen that the application of seven entry pulses has stepped the units order, descendingly, from its initial "7" status to its "0"

status. With the units order in 0 status, the tubes 8a, 12a, 20a and 24a are all held non-conductive by the related triggers 1, 2, 4 and 8. Accordingly, the common output line ZU of these tubes is at increased potential. The increased potential on line ZU is applied to the suppressor of a tube 14, also to the control grid of a tube 28, and to the grid of the tube 2a. In response to the increased potential, tube 2a becomes conductive to block trigger T2. The eighth count down entry pulse applied to the descending counter reverses trigger T1. Inasmuch as trigger T2 is now blocked, the reversal of trigger T1 is ineffective to reverse trigger T2. As the trigger T1 reverses, it acts through a suitable coupling capacitor to apply a positive going impulse to the control grid of the now conditioned tube 14. This tube accordingly becomes conductive and reverses trigger T8. The triggers T1 and T8 are now in reversed status, so that the units order stands at 9. In other words, the units order, when at 0, is stepped by the next entry pulse to 9, as is required of a descending counter. It is further required that upon the units order being stepped from 0 to 9, a subtractive carry of 1 be effected into the tens order. Trigger T8 reverses only when the units order steps from 0 to 9. Upon its reversal, trigger T8 applies a negative pulse to both sides of trigger T10, causing it to shift in status. Since the trigger T10, in the assumed example, was previously in reversed status, this carry pulse from trigger T8 causes the trigger T10 to return to the shown status. Since both triggers T10 and T20 of the tens order are now in reset status, the tens order stands at 0. The related tubes 32a and 36a are then non-conductive and their common anode line ZT is at increased potential which is impressed on the suppressor of tube 28. The descending counter now stands at 9, having been stepped descendingly from its initial "17" status to its "9" status in response to 8 successive entry pulses. The ninth count down entry pulse returns trigger T1 and the counter then stands at 8. The tenth entry pulse turns trigger T1 causing it to turn trigger T2. As trigger T2 turns, it reverses trigger T4. Upon reversal of trigger T4, it resets trigger T8. Thus, the triggers T1, 2 and 4 are now in reversed status, so that the counter stands at 7. It is seen that ten entry pulses have effected a descending value cycle of the units order from its initial "7" status back to a "7" status. Also, during this value cycle, as the units order stepped from 0 to 9, it effected a subtractive carry of 1 from the tens order.

In a manner now clear, seven more entry pulses will bring the units order to "0" status. Thereupon, line ZU goes to high potential, which is impressed on the control grid of the tube 28, previously conditioned by the line ZT under control of the tens order in "0" status. The tube 28 thus becomes conductive when the descending counter is at zero and applies decreased potential to tube 16a, causing output line F to rise in potential. This brings about termination of column shifting, in a manner described below.

The operation of the descending counter has been explained above. The minuend, which is indicative of the column shift amount, is applied to tubes in the descending counter prior to the application of the positive entry signal Ink. This Ink signal comes from the plate of a tube 5–SHC2 (Fig. 15b). The main sequence means operates at the proper time to apply a negative signal Ink to the grid of this tube 5 which thereupon produces the positive Ink signal, as a result of which the column shift amount is entered into the triggers of the descending counter, as described above.

The direction of shift is determined by increased potentials applied to the proper circuits. If the shift is to be to the left, increased potential is applied to line LT (Fig. 15c), but if the shift is to be to the right, then increased potential is applied to line RT. Increased potential on line LT conditions 9–SHC3 (Fig. 15c), while increased potential on line RT conditions 17. Subsequently, the positive signal Ink renders only the conditioned one of the tubes 9 or 17 conductive. If 9 is rendered conductive, it turns trigger 21 to the left (its terminal c goes to low potential) and if 17 is conductive, it turns 21 to the right (its terminal f goes to low potential). If 21 is in its left status, it cuts off 25a, which is a condition for production of the left shift signal LSH at the proper time. If 21 is in right status, it cuts off 25 which is a condition for production of the right shift signal RSH.

The column shift means has its own oscillator and amplifier source of 50 kc. pulses A and B, which are 180 degrees out of phase with each other, as indicated in Fig. 15b.

After entry of the column shift amount into the descending counter, a negative signal SHCL is produced which (Fig. 15b) cuts off 21–SHC2. Tube 21 thereupon applies a positive signal SHCL to the standard SHC cancel circuit (Fig. 15c). The output of the cancel circuit resets those triggers, in a manner as described above (except the triggers in the descending counter) in the internal commutator of the denominational shift means which are marked with the reset status symbol "x." The triggers in the descending counter (Fig. 15a) are in the shown states when the counter is at zero. This counter, however, is reset to zero by the column shifting operation described below.

The positive signal SHCL is also applied to the grids of 38 and 36 in Fig. 15c. In response, 38 cuts off 38a, to turn 39, which then applies, through a capacitor, a positive impulse to 36a which, in turn, through a capacitor, cuts off 40. Tube 40 then causes P40 to produce the first negative cancel signal ACL which, as stated above, is impressed on all the triggers ASH of the shift columns (Figs. 12 and 13). The positive signal SHCL is of short (one AP pulse cycle) duration. When this signal terminates, 36 and 38 become non-conductive. As 36 becomes non-conductive, it resets trigger 39. It is clear that the first cancel signal ACL for the shift columns is produced under control of this signal SHCL.

Concurrently produced with signal SHCL, the negative signal SHRI cuts off 25a (Fig. 15b). Tube 25a then renders a tube 25 conductive to cause a power amplifier P25 to produce the positive going entry SHRI signal which, as stated above, is applied to the shift columns to effect the entry of the number from the Internal In bus column into the shift columns (see Figs. 12 and 13).

The apparatus is now ready for column shifting the number which has been read into the shift columns. The column shift is initiated by a negative start signal SHS (Fig. 15c) produced at the termination of the SHRI read-in or entry signal. This SHS signal has a chance time relation to the 50 kc. A and B pulses continually produced by the SHC oscillator and amplifier (Fig. 15b).

Fig. 14 is a timing chart of pertinent operations which are initiated by the SHS signal and covers specifically the example of a column shift amount of 3 entered into the descending counter (Fig. 15a) as will now be described.

This negative start signal SHS is applied to the control grid of the normally conductive tube 5–SHC3 (Fig. 15c) and also to the terminal g of a trigger 6. This signal cuts off 5, forcing 6 to reverse. The signal is of short duration and at its termination the line carrying the signal returns to high potential and thereby restores 6. Meanwhile, while 6 was reversed it in turn reversed 11, as indicated by the heavy black line labeled 11–SHC3 in Fig. 14. The time of reversal of 11 is an indication of the time of occurrence of the start signal SHS. Upon this reversal of 11, it conditions 12 (Fig. 15c) to become conductive in response to the next B+ pulse, thereby to reverse 15, as shown in Fig. 14 by the heavy black line labeled 15–SHC3. Reversed 15 cuts off 14a. At present, 31a also is cut off, so that the lock couple 31a—14a is effective to condition 35 to respond to the next A+ pulse. This next pulse causes 35 to apply, through a capacitor, a negative pulse to 34 cutting it off, which makes P34 conductive to produce the negative BCL signal, as indicated by the similarly labeled black line in Fig. 14. As stated above, this is the first signal in the sequence of four signals occurring in each shift step, per se. BCL resets triggers BSH of each shift column (see Fig. 12), as previously stated, preparing them to receive a right or left shifted digit. When 15 was reversed at the B+ time to cause the BCL signal to appear at the next A+ time, it also conditioned 16 (Fig. 15c) to respond to A+ pulses. The negative pulses thus produced by 16 are applied to both sides of 20 to alternate its status. The first A+ pulse turns 20 which thereupon cuts off 23a to condition 22 to become conductive with the next B+ pulse. When 22 becomes conductive, it cuts off 26 and 26a. As explained before, if a right shift has been called for, trigger 21 is in right-shifted position and cuts off 25. But, if a left shift has been called for, then 21 is in left-shifted condition and cuts off 25a. Accordingly, when 26 and 26a are now cut off under control of 22, either lock couple 26—25 or 26a—25a becomes fully cut off, depending on whether a right or left shift is to be performed. If 26—25 is cut off, it works through 33 and P33 to produce the positive RSH signal (Figs. 15c and 14) while if 26a—25a is effective, it operates through 29 and P29 to produce the positive LSH signal. As stated above, the signal RSH or LSH (Fig. 12) respectively, causes the right or left shifted digits to be entered in triggers BSH of the shift columns.

When 22 (Fig. 15c) became conductive at the first B+ time in the 1st shift step, it caused the shift signal LSH or RSH to be produced, as just explained. It also reversed 19 which, in turn, reversed 18. With 19 reversed it cuts off 28 to make 31a conductive so that lock couple 31a—14a will be ineffective and the next A+ pulse will not cause a BCL cancel signal to appear. Instead, an ACL cancel signal will be produced which is subsequent to the ACL signal produced at the same time as SHRI, as described above. This results from 28 conditioning 32 to respond to the next A+ pulse. Thereupon, 32 applies, through a capacitor, a negative pulse to 40 as a result of which P40 produces this negative ACL signal (Figs. 15c and 14). This signal, the third in the sequence of the four signals appearing in each shift step per se, resets triggers ASH of each shift column (see Fig. 12), preparing these triggers to receive the shifted digits now temporarily stored in triggers BSH. Successive ACL signals are produced by the internal commutator of the column shift means, in the manner just described.

At the A+ time at which this ACL signal is produced (Fig. 14) 16 (Fig. 15c) responds to an A+ pulse and restores 20. Thereupon 20 cuts off 31 and 23. As 31 is cut off, it produces a positive pulse which is transmitted via line C (Figs. 15c, 15b and 15a) to tube 2–SHC1. In response to this pulse, tube 2–SHC1 produces a negative count down entry pulse which as described above, steps the descending counter to diminish its count by 1. As the descending counter in the assumed example of Fig. 14 started at 3, it is now stepped to a count of 2 (see Fig. 14). In this manner the descending counter is operated in each shift step to reduce the count by 1 each time.

The first three signals, in the 1st shift step per se, have been produced in the manner just explained. These first three signals are, namely, BCL at the A+ time in the shift step (Fig. 14) LSH or RSH at the succeeding B+ time, and ACL at the following A+ time. The fourth and final signal in the sequence for each shift step per se is the SHE signal which is produced at the B+ time following the ACL signal. The SHE signal will cause the shifted digits to be transferred from triggers BSH to ASH. It was explained above that 20–SHC3 (Fig. 15c) was restored by the second A+ pulse in the shift step and thereupon cut off the tubes 31 and 23. The tube 31 thereupon caused the descending counter to diminish the count by 1. The tube 23, when cut off, conditions 24 to become conductive with the next B+ pulse. When 24 becomes conductive it cuts off 27. Tube 27a has already been cut off by the previously mentioned reversal of trigger 18 (also see Fig. 14) which will not be restored until the end of the last shift step. Accordingly, when 24 cuts off 27, the lock couple 27—27a is effective to make 30 conductive and thereupon cause P30 to produce the SHE signal. This signal SHE, as previously stated, causes the shifted digit to be transferred from temporary storage triggers BSH (Fig. 12) of each shift column to triggers ASH of the same shift column. This will complete one step of shift.

The same sequence of signals BCL, LSH or RSH, ACL and SHE, along with a step of descent of the descending counter to 1, in the example assumed, is repeated in the 2nd shift step. A 3rd shift step then takes place in which this same sequence of signals is again produced and half way in this 3rd shift step the descending counter is stepped to 0. As previously described, when the descending counter is at 0, the tube 16a–SHC1 (Fig. 15a) applies increased potential to the line F (Figs. 15a, b and c). The increased potential on this line renders 8a–SHC3 conductive to restore 11 (Fig. 14). With 11 restored, it conditions 10 to operate in response to the next B+ pulse to restore 15 (Fig. 14). With 15 restored, it conditions 13 to become conductive with the next A+ pulse and thereupon to restore 18 (Fig. 14). It will be noted that 18 is restored at the termination of the SHE signal (Fig. 14) in the last shift step. All the triggers 11, 15, 20, 19 and 18 are now in reset status and the shift steps are terminated.

In the foregoing manner, when the column shift amount is assumed as 3, three shift steps are produced. Similarly, any other number of required column shift steps are performed, the number of such steps being determined by the column shift number applied to the descending counter.

At the termination of the steps of column shift, the shifted number in the denominational shift unit (Fig. 12) is to be read out upon the corresponding Internal Out bus columns. As already explained, 18–SHC3 (Fig. 15c) was restored at the end of the last shift step. As 18 restores, it applies a negative going pulse to 14 causing 14 to apply a positive going pulse by way of a line 14w (also see Fig. 15b) and a capacitor to the control grid of the normally conditioned tube 39–SHC2. Accordingly, 39 becomes conductive and turns the trigger 40 (Fig. 15b). As 40 turns, it makes 36 conduct to produce a negative going shift complete signal SHCP. This signal is utilized to produce a negative read out signal SHRO which is applied to 32–SHC2 (Fig. 15b) cutting it off. Thereupon, 35a becomes conductive and restores 40. Also 35 becomes conductive and acts through P35 to produce a positive going SHRO signal. As described before, this SHRO positive signal (Fig. 12) causes the number stored in the triggers ASH of the shift columns to be applied to the buses of the associated Internal Out bus column.

When the column shift amount is 0, and a number is entered from the Internal In bus column to the denominational shift unit, it will be read out of this unit to the Internal Out bus column with no column shift. When the denominational shift amount is 0, the descending counter (Fig. 15a) maintains line F at increased potential to condition a tube 7–SHC3 (Fig. 15c). Then, when the start signal SHS turns trigger 6 (Fig. 15c) the trigger applies a positive pulse through a capacitor to the conditioned tube 7 to render it conductive. The output of this tube is applied via a wire 7w (see also Fig. 15b) and the anode resistor of 39–SHC2 to the trigger 40, turning this trigger. The effect of this is to cause the shift complete signal SHCP to be produced, in the manner just explained above. Consequently, the read out signal SHRO will be produced, causing the number read into the denominational shift unit to be read out, without a column shift. Novel means have therefore been described for producing a selected number of steps of column shift and in a desired direction by electronic means which are inherently fast in operation whereby the requisite number of column shifts can be performed at extremely high speeds so that the overall speed of a series of computation steps can be greatly increased.

While there have been shown and described and pointed out the fundamental novel features of the invention as applied to a single modification, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A digit shifting circuit for shifting a digit from one order to another, each order comprising digit storage means and shift control means, circuit means coupling the digit storage means of a given one order to an associated shift control means allocated to another order whereby said shift control means is selectively conditioned in accordance with the status of the connected storage means, means applying a shift producing energy change to all said shift control means, and means respectively connecting the shift control means of a given order to the digit storage means of another order whereby the digit stored in a given order is shifted under control of said energy change to the storage means of another order.

2. A digit shifting circuit for shifting a digit from one order to another, each order comprising a plurality of digit storage means, shift control means, circuit means coupling the digit storage means of one order to the associated shift control means allocated to the other order whereby said shift control means is selectively conditioned in accordance with the status of the connected storage means, means connecting the shift control means coupled to one order to the digit storage means of another order, and means for applying a shift producing energy change to all said shift control means whereby the digit stored in one order is shifted to another order.

3. A digit shifting circuit for shifting a digit from one order to another, each order comprising electron valve trigger type digit storage means, an electron gate controlled by the status of a trigger in one order and connected to a trigger in another order, means applying a shift producing energy change to all said gates whereby the digit stored in one order is shifted to another order, each order comprising a plurality of said trigger type storage means, said triggers in each order being less in number than the radix employed.

4. A digit shifting circuit for shifting a digit from one order to another, each order comprising electron valve trigger type digit storage means, an electron gate controlled by the status of a trigger in another order, trigger means connected to said gate intermediate said gate and the trigger storage means of its order, for intermediate storage of a digit representation and means applying a shift producing energy change to all said gates whereby the digit stored in one order is shifted to said intermediate trigger means preparatory to transfer to the trigger storage means of its order.

5. A digit shifting circuit for shifting a digit from one order to another, each order comprising electron valve trigger type digit storage means, an electron gate controlled by the status of a trigger in one order and connected to a trigger in another order, means applying a shift producing energy change to all said gates whereby the digit stored in one order is shifted to another order and means including said gates for controlling the direction of shift of a digit stored in any order, selectively, to either the right or to the left.

6. A device as in claim 5, said gates comprising duplicate gate means in each order, respectively controlled in accordance with the direction of shift desired.

7. A digit shifting circuit for shifting a digit from one order to another, each order comprising electron valve trigger type digit storage means, an electron gate controlled by the status of a trigger in one order and connected to a trigger in another order, means applying a shift producing energy change to all said gates whereby the digit stored in one order is shifted to another order and counter means controlling said shift producing means to produce a controlled number of shift producing energy changes whereby the number of steps of shift is determined by said counter.

8. A device as in claim 7, and means for setting said counter means to a setting determinative of the number of steps to be produced.

9. A device as in claim 7, and means including said gates for controlling the direction of shift, said counter means controlling the number of steps of shift in a selected direction.

10. A device as in claim 4 and duplicate gate means connected to said intermediate storage trigger.

11. A digit shifting circuit for shifting a digit from one order to another, each order comprising a plurality of digit storage means, a plurality of said orders, shift control means respectively connected to each digit storage means, circuit means coupling each of the digit storage means of one order to the shift control means of another order, means selectively operating said digit storage means in each order to represent a digit stored therein, said coupling means selectively conditioning said shift control means in accordance with said represented digit, and means applying an energy change to all said shift control means whereby each selected digit representation in one order is shifted to another order.

12. A shifting register comprising a set of electron valve trigger elements, means for selectively setting said trigger elements to represent a digit, a second set of trigger elements, electron gate means connected to each of said first set of trigger elements, respectively, and conditioned selectively in accordance with the individual setting of the trigger connected thereto, means coupling each of said gates to one of the triggers of said second set, means applying an energy change to all said gates whereby the selective setting of said first set of triggers is transferred to said second set, said sets of triggers being less in number than the radix employed.

13. A shifting register comprising a set of electron valve trigger elements, means for selectively setting said trigger elements to represent a digit, a second set of trigger elements, electron gate means connected to each of said first set of trigger elements, respectively, and conditioned selectively in accordance with the individual setting of the trigger connected thereto, means coupling each of said gates to one of the triggers of said second set, means applying an energy change to all said gates whereby the selective setting of said first set of triggers is transferred to said second set and a duplicate set of gates connected between said first set of triggers and another set.

14. A device as in claim 13, and means for selectively rendering one only of said sets of gates operative at any one time, to control direction of shift from one set of triggers to another.

15. A shifting register comprising a set of electron valve trigger elements, means for selectively setting said trigger elements to represent a digit, a second set of trigger elements, electron gate means connected to each of said first set of trigger elements, respectively, and conditioned selectively in accordance with the individual setting of the trigger connected thereto, means coupling each of said gates to one of the triggers of said second set, means applying an energy change to all said gates whereby the selective setting of said first set of triggers is transferred to said second set and including a plurality of said dual sets of triggers, and counter means controlling said energy change applying means to control the number of times of application of said energy changes in accordance with the value entered in said counter to thereby control the number of steps of shift among said trigger sets.

16. A register comprising a set of electron valve trigger elements, means for individually setting said trigger elements whereby the permutation of settings of said set is representative of a selected digit, electron gate means, one connected respectively to each trigger and means effective to control said gate means and said trigger set whereby said first permutation of settings is replaced by a separate permutation entered via said gates.

17. A device as in claim 16, a second set of trigger elements, means for individually setting said second set, means respectively connecting said second set to said gates, and means whereby said gates are rendered effective to transfer the permutation of settings of one of said sets to the other of said sets.

18. A device as in claim 17, cancel means for cancelling the settings of one of said set of triggers and means for rendering said cancel means and said gates effective whereby the permutation of one of said sets is cancelled and replaced by the permutation of the other of said sets.

19. A shifting register comprising a plurality of at least three bi-stable elements connected in cascade each initially respectively storing a binary 1 or a binary 0 representation of a value, dependent upon which of said bi-stable conditions is assumed, means statically sensing an initial binary 1 or binary 0 condition of one of said elements and means for transferring the binary 1 condition of any one element to the next one of said cascaded elements as a lateral shifting operation between cascaded elements, including means for applying a change of energy to said sensing means thereby rendered operative only upon such an applied change of energy and its associated storing element being in the binary 1 condition to transfer said binary 1 condition to the next one of said cascaded elements, each binary 1 conditioned element remaining in its binary 1 condition, during said sensing, but operable respectively to either a binary 1 condition or a binary 0 condition immediately subsequent thereto dependent upon the initial binary 1 or binary 0 condition of a preceding one of said bi-stable elements whereby the one condition of any one element is transferred to another element and any one element is altered to or retains the binary 1 or binary 0 status of a preceding one of said bi-stable elements.

20. A shifting register comprising a plurality of bi-stable elements each respectively storing a binary 1 or a binary 0 respresentation of a value, dependent upon which of said bi-stable conditions is assumed, means statically sensing a binary 1 or binary 0 condition of one of said elements and means for transferring the binary 1 condition of said one element to another of said elements, as a shifting operation, including means for applying a change of energy to said sensing means thereby rendered operative only upon such an applied change of energy and its associated storing element being in the binary 1 condition, to transfer said binary 1 condition to another element, said first element remaining in its binary 1 condition, during said sensing, whereby the one condition of said first element is transferred to said other element and said first element remains in its one condition, during the initiation of said shift operation and including means for transferring said binary 1 condition, selectively, in either one of two chosen directions.

21. A device as in claim 20, each of said elements including means providing an additional transfer output and including means for transferring said binary 1 conditions via said additional output.

22. A digit circuit for shifting a digit from one order to another, each order comprising a dual stability storage means, means statically sensing the setting of one order without altering its state and connected to another order, and means applying a shift producing energy change to said sensing means, whereby a digit stored in said one order is shifted to said other order and including means for controlling the direction of said shift, selectively, in one direction or another.

23. A device as in claim 22, each of said dual stability means including means providing an additional shift output and including means for shifting said stored digits via said additional output.

24. A shifting register for shifting data from one unit to another comprising in combination at least, two dual stability storage units and at least one transfer unit, said transfer unit comprising means for statically sensing the condition of one of said storage units without altering its status, selective transmission means, for receiving an applied change of energy, including said transfer unit, connected between said storage units, to statistically sense the status of said units and to transmit an energy change supplied thereto, only under a predetermined status of said unit being sensed and including means for transferring said energy changes selectively, to either one or the other of said units, from either the other or said one, respectively.

25. A device as in claim 24 and including means for transferring the data in said units simultaneously out of all of said units without alteration of the state of stability existing in said units.

26. In binary digital computing and counting apparatus the combination of at least two multivibrator storage units and at least one transfer unit; said storage units each having two oppositely designated output terminals and a triggering input terminal, and having two stable states of conduction; said transfer unit comprising a multiterminal potential sensing and selective transmission network having at least two sensing terminals, an input terminal for receiving triggering voltage pulses, and an output terminal for transmitting said voltage pulses; said transfer unit being interconnected between said storage units to sense through said sensing terminals the potentials of two of said storage unit output terminals, and to transmit triggering voltage pulses supplied at said transfer unit input terminal to said transfer unit output terminal only under predetermined relations of the sensed potentials.

27. A transfer unit, comprising a multiterminal potential-sensing and selective transmission network having at least two sensing terminals, an input terminal for receiving voltage pulses, and an output terminal for transmitting said voltage pulses, said transfer unit being interconnected by said sensing terminals between a pair of double-valued voltage sources to sense the potentials of said sources and to transmit a voltage pulse received at the input terminal thereof to the output terminal of said unit only if the voltage values of said sources are in a predetermined relationship.

References Cited in the file of this patent

UNITED STATES PATENTS

| 2,404,047 | Flory | July 16, 1946 |
| 2,435,840 | Morton | Feb. 10, 1948 |
| 2,666,575 | Edwards | Jan. 19, 1954 |

OTHER REFERENCES

"First Interim Progress Report on the Physical Realization of an Electronic Computing Instrument," by Bigelow, Pomerence, Slutz and Ware; Institute for Advanced Study, Princeton, N. J.; July 28, 1948 (date first distributed to the public); pages 95–100.

"Second Interim Progress Report on the Physical Realization of an Electronic Computing Instrument," by Bigelow et al.; Institute for Advanced Study, Princeton, N. J.; August 25, 1948 (date first distributed to the public); pages 32A to 37A.